(12) United States Patent
Ohno

(10) Patent No.: US 9,487,051 B2
(45) Date of Patent: Nov. 8, 2016

(54) PNEUMATIC RADIAL TIRE

(75) Inventor: Yasuaki Ohno, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 547 days.

(21) Appl. No.: 13/984,794

(22) PCT Filed: Feb. 22, 2012

(86) PCT No.: PCT/JP2012/001208
§ 371 (c)(1),
(2), (4) Date: Aug. 9, 2013

(87) PCT Pub. No.: WO2012/114743
PCT Pub. Date: Aug. 30, 2012

(65) Prior Publication Data
US 2013/0312886 A1 Nov. 28, 2013

(30) Foreign Application Priority Data

Feb. 24, 2011 (JP) ................................ 2011-038826

(51) Int. Cl.
*B60C 3/06* (2006.01)
*B60C 11/03* (2006.01)
(Continued)

(52) U.S. Cl.
CPC . *B60C 3/06* (2013.01); *B60C 5/00* (2013.01); *B60C 9/0292* (2013.04); *B60C 9/17* (2013.01);
(Continued)

(58) Field of Classification Search
CPC ......... B60C 3/04; B60C 3/06; B60C 9/0292; B60C 9/17; B60C 11/0304; B60C 11/033; B60C 11/0332; B60C 13/003; B60C 13/004; B60C 15/0036; B60C 15/0045; B60C 15/0009; B60C 5/00
USPC .......... 152/209.1, 209.8, 209.9, 209.14, 539, 152/541, 548, 552, 554
See application file for complete search history.

(56) References Cited

U.S. PATENT DOCUMENTS 6,527,025 B1  3/2003 Minami
2004/0226642 A1* 11/2004 Muhlhoff ................. B60C 3/04
152/454
(Continued)

FOREIGN PATENT DOCUMENTS

CN 1535215 A 10/2004
EP 0554108 * 8/1993
(Continued)

OTHER PUBLICATIONS

International Search Report, PCT/JP2012/001208, dated Apr. 17, 2012.
(Continued)

*Primary Examiner* — Eric Hug
(74) *Attorney, Agent, or Firm* — Sughrue Mion, PLLC

(57) ABSTRACT

The present invention provides a pneumatic radial tire of the present invention is characterized in that: in a cross sectional view in the tire widthwise direction in the predetermined state thereof, provided that: i) $H_{out}$ represents a distance in the tire radial direction between the maximum width position from the tire equatorial plane and a ground-contact end on the vehicle outer side of the tread and $H_{in}$ represents a distance in the tire radial direction between the maximum width position from the tire equatorial plane and a ground-contact end on the vehicle inner side of the tread, $H_{out}<H_{in}$; ii) radius of curvature ($R_{out}$) of a tire side portion on the vehicle outer side, at the maximum width position thereof, is smaller than radius of curvature ($R_{in}$) of a tire side portion on the vehicle inner side, at the maximum width position thereof; and iii) a negative ratio of a ground-contact surface in a vehicle-outer side half portion of the tread is smaller than a negative ratio of a ground-contact surface in a vehicle-inner side half portion of the tread; and an outer end in the tire radial direction of a turn-up portion is disposed in each of the half portions of the tire at a height in the tire radial direction of at least 40% of the tire cross sectional height.

6 Claims, 3 Drawing Sheets

(51) Int. Cl.
  *B60C 9/17* (2006.01)
  *B60C 15/00* (2006.01)
  *B60C 9/02* (2006.01)
  *B60C 17/00* (2006.01)
  *B60C 13/00* (2006.01)
  *B60C 5/00* (2006.01)
  *B60C 15/02* (2006.01)

(52) U.S. Cl.
  CPC .......... *B60C 11/033* (2013.04); *B60C 11/0332* (2013.04); *B60C 13/003* (2013.01); *B60C 15/0036* (2013.04); *B60C 15/0236* (2013.01); *B60C 17/0009* (2013.04); *B60C 11/0304* (2013.04); *B60C 2015/061* (2013.04); *Y10T 152/10765* (2015.01)

(56) References Cited

U.S. PATENT DOCUMENTS

| | | | | |
|---|---|---|---|---|
| 2010/0294408 | A1* | 11/2010 | Bizzi | B60C 3/06 152/209.8 |
| 2010/0326579 | A1* | 12/2010 | Watabe | B60C 3/06 152/454 |

FOREIGN PATENT DOCUMENTS

| | | | |
|---|---|---|---|
| JP | 05201202 A | | 8/1993 |
| JP | 7-223407 | * | 8/1995 |
| JP | 07-223407 A | | 8/1995 |
| JP | 08-175119 A | | 7/1996 |
| JP | 2000-177308 A | | 6/2000 |
| JP | 2002-192905 | * | 7/2002 |
| JP | 2002192905 A | | 7/2002 |
| JP | 2003025463 A | | 1/2003 |
| JP | 2004231057 A | | 8/2004 |
| JP | 2004-535327 A | | 11/2004 |
| JP | 2007030558 A | | 2/2007 |
| JP | 2009-001228 A | | 1/2009 |
| JP | 2009006983 A | | 1/2009 |
| JP | 2010-195357 A | | 9/2010 |

OTHER PUBLICATIONS

Communication dated Oct. 21, 2015, issued by the State Intellectual Property Office of the P.R.C. in corresponding Chinese Application No. 201280010391.4.

Communication dated Jun. 23, 2015, issued by the Japan Patent Office in corresponding Japanese Application No. 2013-500893.

Communication from Japan Patent Office issued Nov. 11, 2014 in counterpart Japan Patent Application No. 2013-500893.

Communication dated Mar. 6, 2015 from the State Intellectual Property Office of the People's Republic of China in counterpart Application No. 201280010391.4.

* cited by examiner

PNEUMATIC RADIAL TIRE

CROSS REFERENCE TO RELATED APPLICATIONS

This application is a National Stage of International Application No. PCT/JP2012/001208 filed Feb. 22, 2012, claiming priority based on Japanese Patent Application No. 2011-038826 filed Feb. 24, 2011, the contents of all of which are incorporated herein by reference in their entirety.

TECHNICAL FIELD

The present invention relates to a pneumatic radial tire, in particular, a pneumatic radial tire suitable for a passenger car. The present invention especially proposes a technique for effectively reducing rolling resistance of a pneumatic radial tire, while ensuring good stability and controllability thereof.

BACKGROUND ART

Conventional techniques for reducing rolling resistance of a tire include those disclosed in Patent Literature 1, Patent Literature 2 and the like. The invention disclosed in Patent Literature 1, which aims at providing a pneumatic tire capable of reducing rolling resistance without sacrificing stability, controllability and riding comfort, is characterized in that: a fold-back end of a carcass is positioned at the height of ≤0.15 time the height of the tire section; and a short fiber reinforced layer of ≥0.3 mm and ≤1.0 mm in thickness is arranged on the outer surface of the carcass in a sidewall area between a belt end and the fold-back end of the carcass. The short fiber reinforced layer is constituted of: a rubber component obtained by blending 30-60 parts by weight of natural rubber and/or isoprene rubber with 40-70 parts by weight of butadiene rubber; short fiber; and carbon black. At least 90% of the short fiber is oriented at an angle in the range of ±20° relative to the circumferential direction of the tire and the ratio of the complex elasticity $E^*a$ in the direction of orientation of the short fiber, with respect to the complex elasticity $E^*b$ in the direction orthogonal to the direction of orientation, is ≥5.

Further, the invention disclosed in Patent Literature 2, which aims at providing a pneumatic tire capable of making weight reduction and good stability and controllability thereof compatible without reducing riding comfort, characterized in that: a carcass layer is made to be a single layer structure; ends of the carcass layer are each folded around a bead core from the inside toward the outside of the tire to interpose a bead filler therein, to a position which exceeds a tire maximum width and does not reach a belt layer; and the height of the bead filler measured from a bead heel is 15-30% of a tire cross section height, the rubber thickness of a sidewall portion is 3.5-5.0 mm, an inner liner is formed of a thermoplastic elastomer composition having Young's modulus of 5-50 MPa and thickness of 0.05-0.25 mm, and the sidewall portion is made of a rubber composition containing at least 70 wt. % of natural rubber.

CITATION LIST

Patent Literature

PTL 1: JP-A 08-175119
PTL 2: JP-A 2009-001228

SUMMARY OF THE INVENTION

Technical Problems

However, the invention disclosed in Patent Literature 1, which decreases rolling resistance of a tire by reducing tire weight by reducing a dimension in the tire radial direction of a bead filler to suppress eccentricity of the tire, tends to experience deterioration of stability and controllability due to decrease in rigidity of sidewall portions of the tire and there arises a problem that this deterioration of stability and controllability cannot be addressed even by providing an additional reinforcing layers at the sidewall portions.

Similarly, the invention disclosed in Patent Literature 2, although it can realize reduction of tire weight by reducing size of a bead filler, i.e. a shorter bead filler, experiences decrease in rigidity of side portions of the tire and therefore there arises a problem that stability and controllability inevitably deteriorate in spite of efforts of enhancing rigidity of the side portions by increasing rubber thickness of the sidewall portions and forming an inner liner by a thermoplastic resin or a thermoplastic elastomer composition having higher Young's modulus and lower specific gravity than rubber.

More specifically, rolling resistance of a standard pneumatic radial tire for a passenger car, where height in the tire radial direction of a bead filler is at least 25 mm and thickness of sidewall rubber is at least 2.5 mm, can be effectively reduced by decreasing the height in the tire radial direction of the bead filer to 10 mm to 20 mm and the thickness of the sidewall rubber to 1 mm to <2.5 mm (such size reduction, in combination with resulting decrease in eccentricity of the tire, effectively reduces rolling resistance). However, rigidity of side portions of the tire inevitably deteriorates by this modification and it is very difficult to reliably obtain required stability and controllability in such a case even by increasing thickness of sidewall rubber and the like.

The present invention aims at solving such problems as described above of the prior art and an object thereof is to effectively reduce rolling resistance, while ensuring good stability and controllability of a pneumatic radial tire.

Solution to the Problems

When a tire assembled with an application rim, inflated at a predetermined air pressure and mounted on a vehicle in a negative camber state is run straight under a predetermined load exerted thereon, a ground-contact length in the tire circumferential direction of a ground-contact surface portion situated on the vehicle inner side when the tire is mounted on the vehicle, of a tread of the tire, is relatively long, while a ground-contact length in the tire circumferential direction of a ground-contact surface portion situated on the vehicle outer side when the tire is mounted on the vehicle, of the tread, tends to be extremely short, such that an outline of a foot print takes on a substantially blunt triangle-like shape as shown in FIG. 3A. The present invention, being aware of this phenomenon, attempts to increase a ground-contact length in the tire circumferential direction of a ground-contact surface portion situated on the vehicle outer side when the tire is mounted on the vehicle, of the tread of the tire, to be equal to a ground-contact length in the tire circumferential direction of a ground-contact surface portion situated on the vehicle inner side when the tire is mounted on the vehicle, of the tread, during rotation of the tire under a load exerted thereon, such that a relatively large ground-contact area is ensured and the tire exhibits good stability and controllability in both straight running and cornering even when the weight of the tire has been reduced. A pneumatic radial tire of the present invention is characterized in that:

in a cross sectional view in the tire widthwise direction thereof in a state where the tire is assembled with an application rim, inflated at a predetermined air pressure and mounted on a vehicle under a predetermined load exerted thereon, provided that: $L_{out}$ represents an imaginary line, passing through the maximum width position remotest from the tire equatorial plane in a tire side portion situated on the vehicle outer side, to extend to be orthogonal to the tire equatorial plane; $L_{in}$ represents an imaginary line, passing through the maximum width position remotest from the tire equatorial plane in a tire side portion situated on the vehicle inner side, to extend to be orthogonal to the tire equatorial plane; $H_{out}$ represents a distance in the tire radial direction between the imaginary line $L_{out}$ and a ground-contact end on the vehicle outer side of the tread; and $H_{in}$ represents a distance in the tire radial direction between the imaginary line $L_{in}$ and a ground-contact end on the vehicle inner side of the tread, $H_{out}<H_{in}$;

radius of curvature ($R_{out}$) of an outer surface of the tire side portion on the vehicle outer side, at the maximum width position thereof, is smaller than radius of curvature ($R_{in}$) of an outer surface of the tire side portion on the vehicle inner side, at the maximum width position thereof;

a negative ratio, i.e. a groove area ratio, of a ground-contact surface of the tread of a half portion, on the vehicle outer side with respect to the tire equatorial plane, of the tire when the tire is mounted on the vehicle is smaller than a negative ratio of a ground-contact surface of the tread of a half portion, on the vehicle inner side with respect to the tire equatorial plane, of the tire when the tire is mounted on the vehicle; and an outer end in the tire radial direction of a turn-up portion around a bead core, of a carcass constituted of at least of one carcass ply, is disposed in each of the half portions of the tire at a height in the tire radial direction of at least 40% of the tire cross sectional height under no load exerted on the tire.

In the present invention, an "application rim" represents a rim prescribed by the following standard in accordance with a vehicle on which the tire is mounted, "predetermined air pressure" represents air pressure corresponding to the maximum loading capacity in an application tire size prescribed in the standard, and a "predetermined load" represents a load corresponding to the maximum loading capacity in an application tire size prescribed in the standard.

The "standard" represents an industrial standard which is valid in a region where a tire is manufactured or used. Examples of the standard include "YEAR BOOK" of the Tire and Rim Association Inc. in the United States, "STANDARDS MANUAL" of the European Tyre and Rim Technical Organisation in Europe, and "JATMA YEAR BOOK" of Japan Automobile Tyre Manufacturers Association in Japan.

Further, "the maximum width position" of a tire side portion represents a position at an outer surface, remotest from the tire equatorial plane, of each tire side portion of a tire inflated at the predetermined air pressure and right under a predetermined load exerted thereon in the present invention.

Yet further, "the tire cross sectional height" represents a height in the tire radial direction measured from the rim baseline to the outer diameter of the tire.

In the tire of the present invention as described above, the aforementioned distance $H_{in}$ in the tire radial direction between the imaginary line $L_{in}$ and a ground-contact end on the vehicle inner side of the tread is preferably set to be 1.1 to 1.3 times as large as the aforementioned distance $H_{out}$ in the tire radial direction between the imaginary line $L_{out}$ and a ground-contact end on the vehicle outer side of the tread.

Further, it is preferable in the present invention that: the ground-contact surface of the tread of the half portion, on the vehicle inner side with respect to the tire equatorial plane, of the tire when the tire is mounted on the vehicle is provided with two circumferential main grooves; the ground-contact surface of the tread of the half portion, on the vehicle outer side with respect to the tire equatorial plane, of the tire when the tire is mounted on the vehicle is provided with one circumferential main groove; and the average width of a land portion row demarcated between the one circumferential main groove of the ground-contact surface of the vehicle-outer side half portion of the tire and one of the two circumferential main grooves, which is adjacent to the one circumferential main groove, of the ground-contact surface of the vehicle-inner side half portion of the tire is set to be at least 1.5 times as wide as the average width of a land portion row demarcated between the two circumferential main grooves of the ground-contact surface of the vehicle-inner side half portion of the tire.

A width of the land portion row is specified as the average width in the present invention because, even when the circumferential main grooves share the same groove widths and groove depths, at least one of these circumferential main grooves can extend in a zigzag or winding configuration such that the width of the land portion row varies in the circumferential direction.

Yet further, dimension in the tire radial direction of a bead filler, provided on the outer peripheral side of each bead core and between a carcass main body extending in a toroidal shape across the bead cores and the aforementioned turn-up portion of the carcass, is preferably set to be in the range of 10 mm to 20 mm.

Yet further, it is preferable that: the tire further includes at least one belt layer formed by belt cords and provided on the outer peripheral side of a crown region of the carcass; and an external end in the tire radial direction of the turn-up portion of the carcass of at least one of the vehicle-outer side half portion and the vehicle-inner side half portion of the tire is positioned, in the tire radial direction, between the maximum width position remotest from the tire equatorial plane and the outermost end in the tire widthwise direction of the belt layer in the tire side portions (inclusive of the maximum width position and exclusive of the position corresponding to the outermost end in the widthwise direction of the belt layer).

Advantageous Effect of the Invention

According to the pneumatic radial tire of the present invention, radius of curvature of the tire side portion on the vehicle outer side when the tire is mounted on a vehicle, at the maximum width position thereof, is smaller than radius of curvature of the tire side portion on the vehicle inner side when tire is mounted on a vehicle, at the maximum width position thereof. As a result, when load is exerted on the tire, the tire side portion on the vehicle outer side having smaller radius of curvature right under the load is more deformed by larger expansion toward the outer side in the tire widthwise direction, whereby a ground-contact length in the tire circumferential direction of a ground-contact end on the vehicle outer side, of the tread, is elongated to a length substantially equal to a ground-contact length in the tire circumferential direction of a ground-contact end on the vehicle inner side of the tread during straight running of a vehicle and therefore an outline of a foot print takes on a substantially rectangular configuration. That is, it is possible to ensure a relatively large ground-contact area so that the tire exhibits good stability and controllability in both straight running and cornering.

Further, according to the pneumatic radial tire of the present invention, the aforementioned distance $H_{out}$ in the tire radial direction on the vehicle outer side is set to be smaller than the aforementioned distance $H_{in}$ in the tire radial direction on the vehicle inner side, thereby increasing asymmetry in a cross sectional configuration of the tire. As a result, difference in ground-contact length of a ground-contact surface of the tread between the vehicle-inner side half portion and the vehicle-outer side half portion of the tire can be further lessened.

Yet further, according to the pneumatic radial tire of the present invention, a negative ratio of a ground-contact surface of the tread of the vehicle-outer side half portion of the tire is set to be smaller than a negative ratio of a ground-contact surface of the tread of the vehicle-inner side half portion of the tire. As a result, the ground-contact surface of the tread of the vehicle-inner side half portion of the tire can exhibit good drainage performance, and the ground-contact surface of the tread of the vehicle-outer side half portion of the tire can have relatively high rigidity of land portions to ensure generation of relatively large lateral force in a cornering situation of a vehicle and thus good cornering performance of the vehicle.

Yet further, according to the pneumatic radial tire of the present invention, an outer end in the tire radial direction of a turn-up portion of the carcass is disposed in each of the vehicle-outer side half portion and the vehicle-inner side half portion of the tire at a height in the tire radial direction of at least 40%, preferably at least 45%, of the tire cross sectional height. As a result, in a case where weight and rolling resistance of a tire are reduced by decreasing volume of bead fillers, deterioration of rigidities of the tire side portions can be effectively prevented from occurring by the sufficiently large turn-up portions of the carcass, thereby effectively eliminating concern about deterioration of stability and controllability of the tire.

Yet further, according to the pneumatic radial tire of the present invention, the tire may further include at least one belt layer formed by belt cords and provided on the outer peripheral side of a crown region of the carcass; and the external end in the tire radial direction of the turn-up portion of the carcass of at least one (preferably both) of the vehicle-outer side half portion and the vehicle-inner side half portion of the tire may be positioned, in the tire radial direction, between the maximum width position remotest from the tire equatorial plane and the outermost end in the tire widthwise direction of the belt layer in the tire side portions (inclusive of the maximum width position and exclusive of the position corresponding to the outermost end in the widthwise direction of the belt layer). In this case, it is possible to further improve stability and controllability, while effectively curbing rolling resistance.

More specifically, when the outer end of the turn-up portion of the carcass is disposed on the outer side in the tire radial direction of the outermost end in the tire widthwise direction of the belt layer, the tire weight increases to possibly increase rolling resistance of the tire, as well. When the outer end of the turn-up portion of the carcass is disposed on the inner side in the tire radial direction of the maximum width position remotest from the tire equatorial plane of the tire side portion, rigidity of the side portion in the vicinity of the tread decreases to possibly deteriorate stability and controllability of the tire.

In the tire of the present invention, ground-contact properties of the tire mounted on a vehicle can be optimized by setting the aforementioned vehicle-inner side distance $H_{in}$ in the tire radial direction to be 1.1 to 1.3 times as large as the aforementioned vehicle-outer side distance $H_{out}$ in the tire radial direction. More specifically, when the ratio $H_{in}/H_{out}$ is less than 1.1, difference in rigidity of the tire is side portions is small between the vehicle-inner side and the vehicle-outer side, whereby a ground-contact length on the vehicle outer side of a ground-contact surface of the tread is not sufficiently elongated as anticipated or required. When the ratio $H_{in}/H_{out}$ exceeds 1.3, a ground-contact length on the vehicle outer side of a ground-contact surface of the tread is elongated too much, whereby an outline of a foot print then takes on a blunt triangle-like shape which is a mirror-image of the triangle shown in FIG. 3A to disturb the balance of the vehicle.

Further, in the tire of the present invention, it is possible to easily realize required negative ratios in ground-contact surfaces of the tread of the respective tire half portions to make the tire exhibit required drainage and cornering performances by providing a ground-contact surface of the tread of a half portion, on the vehicle inner side with respect to the tire equatorial plane, of the tire when the tire is mounted on the vehicle with two circumferential main grooves; and providing a ground-contact surface of the tread of a half portion, on the vehicle outer side with respect to the tire equatorial plane, of the tire when the tire is mounted on the vehicle with one circumferential main groove.

Yet further, it is possible to further increase lateral force generated in a cornering situation of a vehicle and thus make the vehicle exhibit good cornering performance by setting the average width of a land portion row demarcated between the one circumferential main groove of the vehicle-outer side half portion and one of the two circumferential main grooves (that adjacent to the one circumferential main groove) of the vehicle-inner side half portion of the tire to be at least 1.5 times as wide as the average width of a land portion row demarcated between the two circumferential main grooves of the vehicle-inner side half portion of the tire.

Yet further, in the tire of the present invention, it is possible to decrease volume of a bead filler, i.e. the tire weight as a whole, and thus effectively suppress rolling resistance by setting dimension in the tire radial direction of a bead filler, provided on the outer peripheral side of each bead core and between a carcass main body extending in a toroidal shape across the bead cores and the aforementioned turn-up portion of the carcass, to be in the range of 10 mm to 20 mm.

In this case, decrease in rigidities of the tire side portions and deterioration of stability and controllability of the tire, due to decrease in volume of the bead fillers, can be well compensated by disposing an outer end in the tire radial direction of a turn-up portion of the carcass in each of the vehicle-outer side half portion and the vehicle-inner side half portion of the tire at a height in the tire radial direction of at least 40% of the tire cross sectional height, as described above.

DESCRIPTION OF THE EMBODIMENTS

An embodiment of the present invention will be described hereinafter with reference to the drawings.

Figure 1:
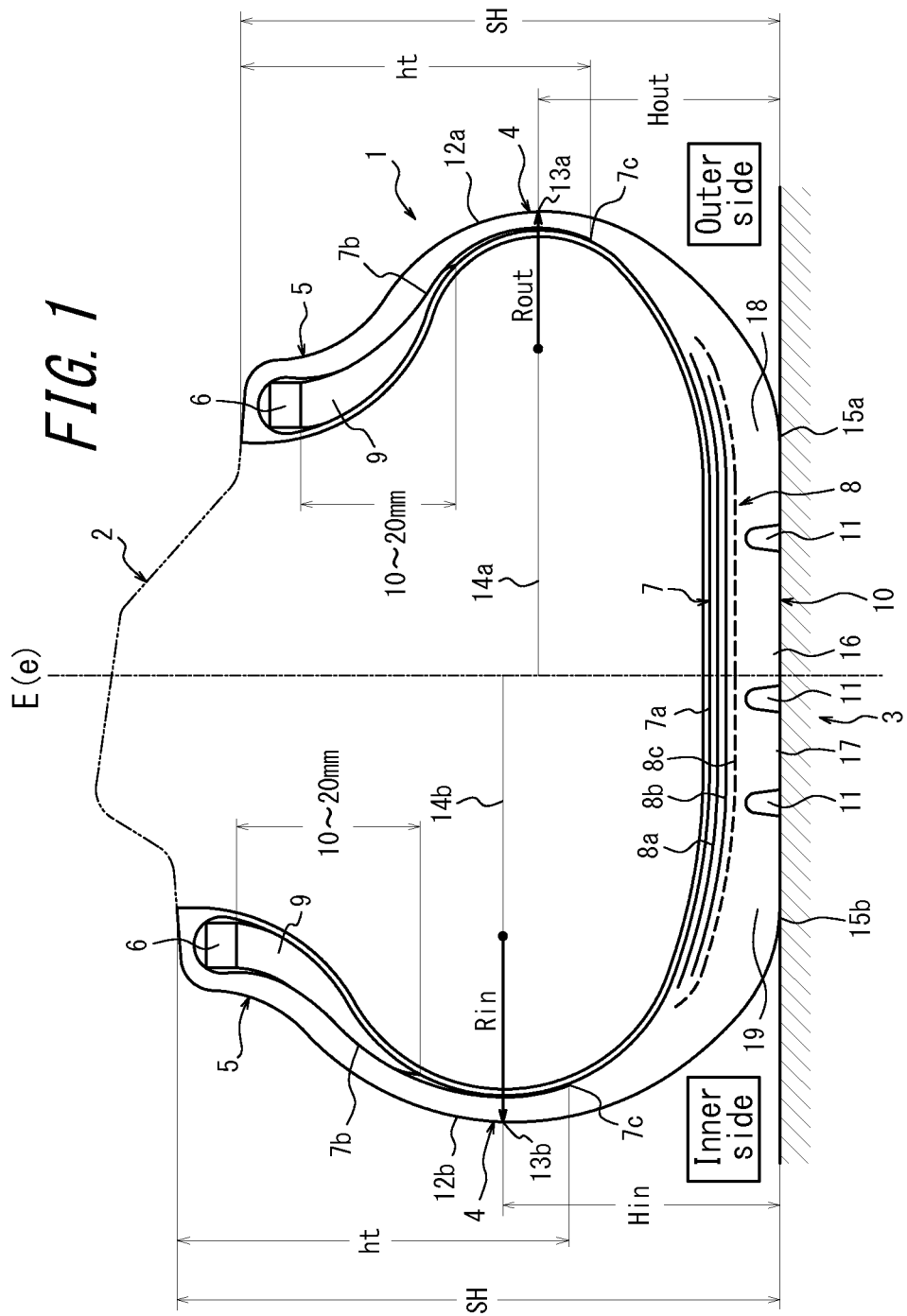
FIG. 1 is a cross sectional view in the tire widthwise direction of a tire according to one embodiment of the present invention, in a state in which the tire has been assembled with an application rim, inflated at predetermined air pressure and mounted on a vehicle with predetermined load exerted thereon.

In FIG. 1, reference number 1 represents an example of a pneumatic radial tire for a passenger car according to the present invention and reference number 2 represents an application rim having the tire 1 assembled therewith.

The pneumatic radial tire 1 inflated at predetermined air pressure and mounted on a vehicle with predetermined load exerted thereon is shown in FIG. 1. Reference number 3 represents a tread portion, 4 represents each sidewall portion extending on the inner side in the tire radial direction to be continuous with each side part of the tread portion 3, and 5 represents each bead portion provided to be continuous with an inner end in the tire radial direction of each sidewall portion 4 in FIG. 1.

A main body 7a of a radial carcass 7 constituted of at least one carcass ply (a single carcass ply in the example shown in FIG. 1) is provided across a pair of bead cores 6 embedded in respective bead portions 5 to extend in a toroidal shape. Respective side end portions of the radial carcass 7 are wound up around the respective bead cores 6 from the inner side toward the outer side in the tire widthwise direction, to constitute respective turn-up portions 7b.

A belt 8, including, e.g. two belt layers 8a, 8b where belt cords of the belt layer 8a intersect belt cords of the belt layer 8b with respect to the circumferential direction of the tread and a belt reinforcing layer 8c where belt cords extend in the circumferential direction of the tread to completely cover the respective belt layers 8a, 8b, is provided on the outer peripheral side of a crown region of the radial carcass 7. Further, a bead filler 9 is provided between the main body 7a and the turn-up portion 7b of the radial carcass 7 to be adjacent to the outer peripheral surface of each bead core 6 such that the bead filler 9 decreases thickness thereof from the position adjacent to the bead core 6 toward the outer side in the tire radial direction.

Plural circumferential (and annular) main grooves 11 continuously extending in the tread circumferential direction in a configuration as desired (such as linear, zigzag) are formed in a ground-contact surface 10 of the tread of the pneumatic radial tire 1 having such an internal reinforcing structure as described above.

A lateral groove or a slant groove (not shown) extending in the tread widthwise direction to intersect the circumferential main groove 11 may be formed in the ground-contact surface 10.

When the tire 1 shown in FIG. 1 is mounted on a vehicle, a half portion on the right-hand side with respect to the tire equatorial plane E of the tire 1 in the drawing is to be situated on the outer side of the vehicle and a half portion on the left-hand side with respect to the tire equatorial plane E of the tire 1 in the drawing is to be situated on the inner side of the vehicle.

In the tire of the present invention, in a cross sectional view in the tire widthwise direction thereof as shown in FIG. 1, provided that: an imaginary line 14a, passing through the maximum width position 13a remotest from the tire equatorial plane E in a tire side portion 12a situated on the vehicle outer side, extends to be orthogonal to the tire equatorial plane E; an imaginary line 14b, passing through the maximum width position 13b remotest from the tire equatorial plane E in a tire side portion 12b situated on the vehicle inner side, extends to be orthogonal to the tire equatorial plane E; $H_{out}$ represents a distance in the tire radial direction between the imaginary line 14a and a ground-contact end 15a on the vehicle outer side of the tread; and $H_{in}$ represents a distance in the tire radial direction between the imaginary line 14b and a ground-contact end 15b on the vehicle inner side of the tread, $H_{out} < H_{in}$. It is preferable to set the distance $H_{in}$ in the tire radial direction to be 1.1 to 1.3 times as large as the distance $H_{out}$ in the tire radial direction.

Further, in the tire of the present invention, radius of curvature $R_{out}$ of an outer surface of the tire side portion 12a on the vehicle outer side, at the maximum width position 13a thereof, is set to be smaller than radius of curvature $R_{in}$ of an outer surface of the tire side portion 12b on the vehicle inner side, at the maximum width position 13b thereof. It is preferable to set the radius of curvature $R_{in}$ to be 1.1 to 1.3 times as large as the radius of curvature $R_{out}$.

Yet further, a negative ratio, i.e. a groove area ratio, of the ground-contact surface 10 of the tread of the half portion, on the vehicle outer side, of the tire when the tire is mounted on the vehicle is smaller than a negative ratio of the ground-contact surface 10 of the tread of the half portion, on the vehicle inner side, of the tire when the tire is mounted on the vehicle. It is preferable to set the negative ratio in the vehicle-inner side half portion to be 1.5 to 2.0 times as large as the negative ratio in the vehicle-outer side half portion.

Yet further, an outer end 7c in the tire radial direction of a turn-up portion 7b, wound around the bead core 6, of the carcass 7 is disposed in each of the vehicle-outer side half portion and the vehicle-inner side half portion of the tire at a height in the tire radial direction of at least 40%, preferably at least 45%, of the tire cross sectional height SH of the tire inflated at predetermined internal pressure with no load exerted thereon.

Yet further, in the tire 1 of the present invention structured as described above, the external end 7c of the turn-up portion 7b of the carcass 7 of at least one (preferably both) of the vehicle-outer side half portion and the vehicle-inner side half portion of the tire is preferably positioned, in the tire radial direction, between the maximum width position 13a, 13b and the outermost end in the tire widthwise direction of the inner most belt layer 8a in the tire side portions 12a, 12b (inclusive of the maximum width position and exclusive of the position corresponding to the outermost end in the widthwise direction of the innermost belt layer 8a).

Figure 2:
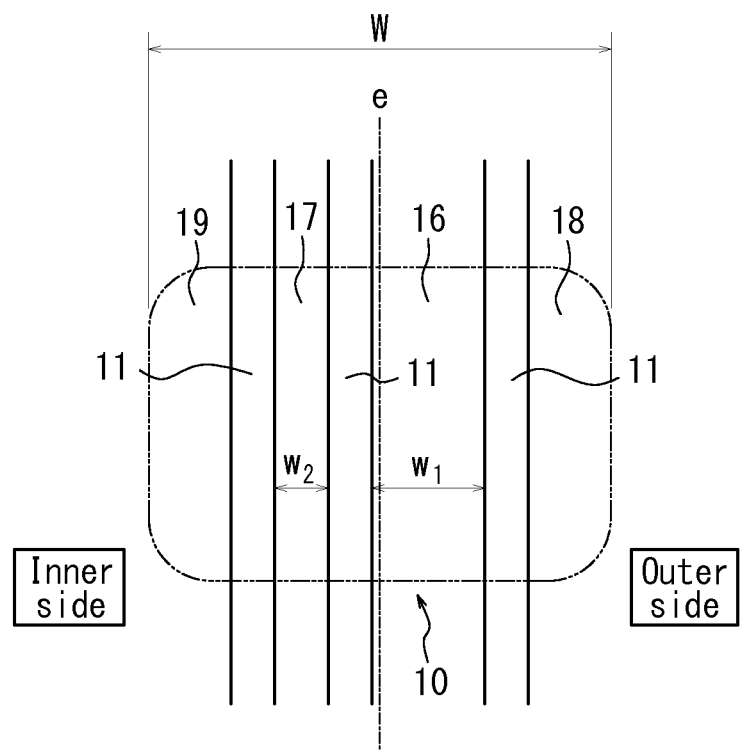
FIG. 2 is a developed partial plan view of a tread pattern as an example of a ground-contact surface of a tread having circumferential main grooves formed therein.

Yet further, plural circumferential (and annular) main grooves 11 extending in the tread circumferential direction in a configuration as desired such as linear, zigzag shape (two linear circumferential main grooves 11 in FIG. 2) are formed in the tread 3 such that these main grooves 11 are located in a half portion on the vehicle-inner side with respect to the tire equatorial plane e, of the ground-contact surface 10 of the tread of the tire 1, when the tire 1 is mounted on a vehicle; and another one circumferential (and annular) main groove 11, which extends in a configuration as desired and may have the same groove width and groove depth as those of the aforementioned two circumferential main grooves 11, is formed in the tread 3 such that the one main groove 11 is located in a half portion on the vehicle-outer side with respect to the tire equatorial plane e, of the ground-contact surface 10 of the tread of the tire 1, when the tire 1 is mounted on a vehicle, as exemplarily shown in a developed view of a tread pattern of FIG. 2.

The negative ratio in the vehicle-inner side half portion of the ground-contact surface 10 of the tread and the negative ratio in the vehicle-outer side half portion of the ground-contact surface 10 are set as described above, respectively. The average width w1 of a land portion row 16 demarcated between the one circumferential main groove 11 of the vehicle-outer side half portion and one of the two circumferential main grooves 11 (that adjacent to the one circumferential main groove) of the vehicle-inner side half portion, of the ground-contact surface 10, is set to be at least 1.5 times, preferably at least 2.0 times, as wide as the average width w2 of a land portion row 17 demarcated between the two circumferential main grooves 11 of the vehicle-inner side half portion of the ground-contact surface 10, so that land portions of the vehicle-outer side half portion of the ground-contact surface 10 is imparted with rigidity as required.

A land portion row 18 demarcated between the one circumferential main groove 11 in the vehicle-outer side half portion and the ground-contact end 15*a* on the outer side in the tire widthwise direction, of the ground-contact surface 10, and a land portion row 19 demarcated between one of the two circumferential main grooves 11 in the vehicle-inner side half portion and the ground-contact end 15*b* on the inner side in the tire widthwise direction, of the ground-contact surface 10, may have widths equivalent to 25% to 30% of the ground-contact width W of the tread, respectively. Phantom line in FIG. 2 represents an example of outline of a foot print.

Further, dimension in the tire radial direction of the bead filler 9, provided on the outer peripheral side of each bead core 6 and between the carcass main body 7*a* and the turn-up portion 7*b* of the carcass 7 as shown in FIG. 1, is preferably set to be in the range of 10 mm to 20 mm, preferably in the range of 10 mm to 15 mm, so that tire weight is reliably reduced to ensure decrease in rolling resistance of the tire.

Figure 3A:
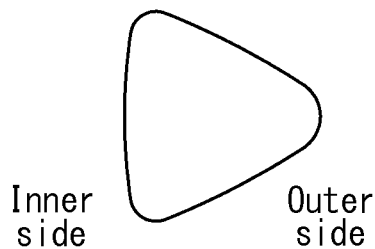
FIG. 3A is a diagram showing an example of an outline of a foot print observed in a conventional tire during straight running of a vehicle.
Figure 3B:
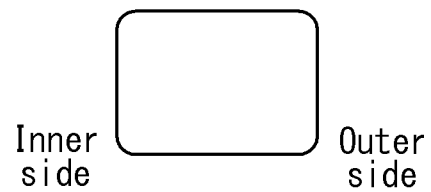
FIG. 3B is a diagram showing how the outline of a foot print shown in FIG. 3A is improved in the present invention.

According to the tier 1 structured as described above, radius of curvature $R_{out}$ of the tire side portion 12*a* on the vehicle outer side when the tire is mounted on a vehicle, at the maximum width position 13*a* thereof, is made smaller than radius of curvature $R_{in}$ of the tire side portion 12*b* on the vehicle inner side when tire is mounted on the vehicle, at the maximum width position 13*b* thereof, so that the tire side portion 12*a* on the vehicle outer side is sufficiently deformed by expanding toward the outer side in the tire widthwise direction when load is exerted on the tire. As a result, an outline of a foot print of the tire during straight running of a vehicle, which takes on a substantially blunt triangle-like shape as shown in FIG. 3A in the conventional tire having a symmetrical cross sectional configuration in the tire widthwise direction with respect to the tire equatorial plane e, can be improved to a substantially rectangular shape as shown in FIG. 3B, so that a ground-contact length in the tread circumferential direction of a ground-contact surface on the vehicle-outer side of the tread can be sufficiently elongated. That is, according to the tire 1 of the present invention, it is possible to reduce tire weight and make the tire demonstrate good stability and controllability in straight running and cornering, respectively, due to high road-surface-gripping force achieved under a large ground-contact area.

Yet further, the aforementioned distance $H_{out}$ in the tire radial direction on the vehicle outer side is set to be smaller than the aforementioned distance $H_{in}$ in the tire radial direction on the vehicle inner side in the tire 1 of the present invention, thereby changing rigidities of the tire side portions 12*a*, 12*b* to differentiate case lines of the tire side portions from each other when the tire is inflated at predetermined internal pressure. Consequently, case lines of a ground-contact surface of the tread are differentiated between the inner side and the outer side of the vehicle with respect to the tire equatorial plane, so that a ground-contact length of the ground-contact surface of the tread on the vehicle-outer side can be made sufficiently close to a ground-contact length of the ground-contact surface of the tread on the vehicle-inner side.

Figure 4:
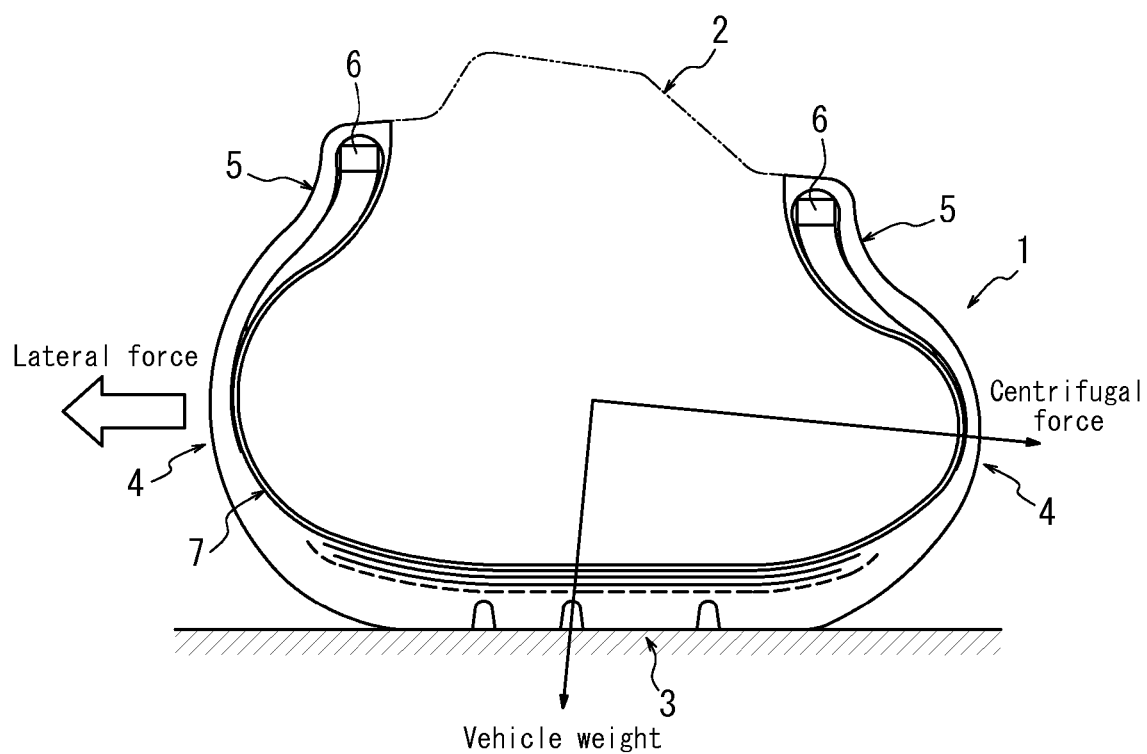
FIG. 4 is a cross sectional view in the widthwise direction of a tire having the tread pattern of FIG. 2, exemplarily showing how lateral force is generated in a cornering situation of a vehicle.

Yet further, a negative ratio of a ground-contact surface 10 of the tread of the vehicle-outer side half portion of the tire is set to be smaller than a negative ratio of a ground-contact surface of the tread of the vehicle-inner side half portion of the tire in the tire 1 of the present invention, so that rigidity of land portions of the ground-contact surface 10 of the tread of the vehicle-outer side half portion of the tire increases. The land portions of the ground-contact surface 10 of the tread of the vehicle-outer side half portion of the tire, having rigidity thus increased, can reliably support generation of lateral force large enough to resist centrifugal force when these land portions are situated on the outer side in a cornering situation of a vehicle, as shown in FIG. 4.

Yet further, in the tire 1 of the present invention, an outer end 7*c* in the tire radial direction of the turn-up portion 7*b* of the carcass 7 is disposed in each of the vehicle-outer side half portion and the vehicle-inner side half portion of the tire at a height in the tire radial direction of at least 40% of the tire cross sectional height SH of the tire. As a result, decrease in rigidities of the tire side portions caused by decrease in weight of the tire can be compensated by the turn-up portions 7*b* to sufficiently eliminate concern about deterioration of stability and controllability of the tire.

Yet further, the external end 7*c* in the tire radial direction of the turn-up portion 7*b* of the carcass 7 of at least one (preferably both) of the vehicle-outer side half portion and the vehicle-inner side half portion of the tire is positioned, in the tire radial direction, between the maximum width position 13*a*, 13*b* and the outermost end in the tire widthwise direction of the inner most belt layer 8*a* (inclusive of the maximum width position and exclusive of the position corresponding to the outermost end in the widthwise direction of the innermost belt layer 8*a*) in the tire 1 of the present invention. As a result, rigidities of the tire side portions in the vicinity of the tread portion 3 are enhanced, thereby further improving stability and controllability of the tire, while suppressing increase in tire weight.

EXAMPLES

Actual car tests for evaluating "rolling resistance" and "stability and controllability" were carried out for each of Example tires and Comparative Example tires having size: 215/60 R16. Measurement results shown in Table 1 are expressed as index values relative to the results of Comparative Example 1 tire as the control each expressed as 100.

The larger index value represents the better result.

The respective Example tires have: ratio (ht/SH) of the height ht of the outer end of the turn-up portion of the radial carcass with respect to the cross sectional height SH of the tire, ratio $H_{in}/H_{out}$, and dimension in the tire radial direction of the bead filler as shown in Table 1; $R_{in}$=80 mm and $R_{out}$=60 mm ($R_{in}/R_{out}$=1.33); and ht/SH in the range of 40% to 90%.

The respective Comparative Example tires have: ratio ht/SH and ratio $H_{in}/H_{out}$ as shown in Table 1; and dimension in the tire radial direction of the bead filler=15 mm, $R_{in}$=$R_{out}$=70 mm $R_{in}/R_{out}$=1.0).

The position in the tire radial direction of the outermost end in the tire widthwise direction of the innermost belt layer was 90% of the tire cross sectional height SH, the negative ratio in the vehicle-inner side half portion of the ground-contact surface of the tread was 30%, and the negative ratio in the vehicle-outer side half portion of the ground-contact surface was 35% for each of the Example tires and the Comparative Example tires.

Further, a ground-contact surface of the tread of the half portion, on the vehicle inner side with respect to the tire equatorial plane, of the tire when the tire was mounted on the vehicle was provided with two circumferential main grooves; a ground-contact surface of the tread of the half portion, on the vehicle outer side with respect to the tire equatorial plane, of the tire when the tire was mounted on the vehicle was provided with one circumferential main groove; the average width of a land portion row demarcated between the one circumferential main groove of the vehicle-outer side half portion and one of the two circumferential main grooves (that adjacent to the one circumferential main groove) of the vehicle-inner side half portion, of the ground-contact surface, was set to be 40 mm; and the average width of a land portion row demarcated between the two circumferential main grooves of the vehicle-inner side half portion of the ground-contact surface was 20 mm.

For each of the Example tires and the Comparative Example tires, the vehicle-outer side half portion and the vehicle-inner side half portion of the ground-contact surface of the tread shared basically the same dimensions and relationships therebetween, except that those described above including $H_{in}/H_{out}$ and $R_{in}/R_{out}$.

In the present invention, rolling resistance is determined by: assembling a tire with an application rim (6.5 J) prescribed in JATMA; inflating the tire at air pressure of 210 KPa; running the tire at 80 km/hour on an indoor drum tester with load (5.42 kN) equivalent to 73% of the maximum loading capacity prescribed in JATMA exerted thereon; and measuring resistance in the tire travelling direction generated at a ground-contact surface.

Stability and controllability of an actual car is determined by: assembling a tire with a vehicle-designated rim (7.0 J); inflating the tire at the vehicle-designated air pressure (250 KPa) and mounting the tire on a passenger car; running the car on an outdoor test course at speed generally expected of a passenger car (60 km/hour to 120 k/hour) under a loading condition of two passengers (3.38 kN to 4.95 kN); and evaluating stability and controllability of the car by feelings. The results of "rolling resistance" and "stability and controllability" in Table 1 are expressed as index values, respectively, relative to the results of Comparative Example 1 tire as the control each expressed as 100. The larger index value represents the better performance.

It is understood from Table 1 that the Example tires have unanimously achieved effective reduction of rolling resistance, with successfully ensuring good stability and controllability.

REFERENCE SIGNS LIST

1 Pneumatic radial tire
2 Application rim
3 Tread portion
4 Sidewall portion
5 Bead portion
6 Bead core
7 Radial carcass
7a Main body of radial carcass
7b Turn-up portion of radial carcass
7c Outer end of turn-up portion
8 Belt
8a, 8b Belt layer
8c Belt reinforcing layer
9 Bead filler
10 Ground-contact surface of tread

TABLE 1

|  | Ex. 1 tire | Ex. 2 tire | Ex. 3 tire | Ex. 4 tire | Ex. 5 tire | Ex. 6 tire | Ex. 7 tire | Ex. 8 tire | Ex. 9 tire | Ex. 10 tire |
|---|---|---|---|---|---|---|---|---|---|---|
| Ratio of height of outer end of turn-up portion of carcass with respect to tire cross sectional height (ht/SH) | 0.40 | 0.50 | 0.80 | 0.90 | 0.40 | 0.40 | 0.40 | 0.40 | 0.40 | 0.40 |
| $H_{in}/H_{out}$ | 1.2 | 1.2 | 1.2 | 1.2 | 1.05 | 1.1 | 1.3 | 1.4 | 1.2 | 1.2 |
| Dimension in tire radial direction of bead filler (mm) | 15 | 15 | 15 | 15 | 15 | 15 | 15 | 15 | 12 | 10 |
| Index value of rolling resistance | 105 | 104 | 103 | 99 | 102 | 105 | 105 | 102 | 106 | 107 |
| Index value of stability and controllability | 105 | 110 | 110 | 111 | 101 | 105 | 105 | 101 | 104 | 104 |

|  | Ex. 11 tire | Ex. 12 tire | Ex. 13 tire | Comp. Ex. 1 tire | Comp. Ex. 2 tire | Comp. Ex. 3 tire |
|---|---|---|---|---|---|---|
| Ratio of height of outer end of turn-up portion of carcass with respect to tire cross sectional height (ht/SH) | 0.40 | 0.40 | 0.40 | 0.30 | 0.40 | 0.30 |
| $H_{in}/H_{out}$ | 1.2 | 1.2 | 1.2 | 1 | 1 | 1.2 |
| Dimension in tire radial direction of bead filler (mm) | 12 | 20 | 22 | 15 | 15 | 15 |
| Index value of rolling resistance | 106 | 104 | 101 | 100 | 100 | 100 |
| Index value of stability and controllability | 105 | 105 | 105 | 100 | 101 | 101 |

11 Circumferential main groove
12a, 12b Tire side portion
13a, 13b Maximum width position
14a, 14b Imaginary line
15a, 15b Ground-contact end of tread
16-19 Land portion row
E Tire equatorial plane
e Tire equatorial plane
$H_{in}$, $H_{out}$ Distance in tire radial direction
$R_{in}$, $R_{out}$ Radius of curvature
w1, w2 Average width
W Ground-contact surface width of tread
Ht Height of outer end of turn-up portion of radial carcass
SH Tire cross sectional height

The invention claimed is:

1. A pneumatic radial tire, characterized in that:
in a cross sectional view in the tire widthwise direction thereof in a state where the tire is assembled with an application rim, inflated at a predetermined air pressure and mounted on a vehicle under a predetermined load exerted thereon, provided that: $L_{out}$ represents an imaginary line, passing through the maximum width position remotest from the tire equatorial plane in a tire side portion situated on the vehicle outer side, to extend to be orthogonal to the tire equatorial plane; $L_{in}$ represents an imaginary line, passing through the maximum width position remotest from the tire equatorial plane in a tire side portion situated on the vehicle inner side, to extend to be orthogonal to the tire equatorial plane; $H_{out}$ represents a distance in the tire radial direction between the imaginary line $L_{out}$ and a ground-contact end on the vehicle outer side of the tread; and $H_{in}$ represents a distance in the tire radial direction between the imaginary line $L_{in}$ and a ground-contact end on the vehicle inner side of the tread, $H_{out} < H_{in}$;
radius of curvature ($R_{out}$) of the tire side portion on the vehicle outer side, at the maximum width position thereof, is smaller than radius of curvature ($R_{in}$) of the tire side portion on the vehicle inner side, at the maximum width position thereof;
a negative ratio of a ground-contact surface of the tread of a half portion, on the vehicle outer side with respect to the tire equatorial plane, of the tire when the tire is mounted on the vehicle is smaller than a negative ratio of a ground-contact surface of the tread of a half portion, on the vehicle inner side with respect to the tire equatorial plane, of the tire when the tire is mounted on the vehicle;
an outer end in the tire radial direction of a turn-up portion around a bead core, of a carcass constituted of at least of one carcass ply, is disposed in each of the half portions of the tire at a height in the tire radial direction of at least 40% of the tire cross sectional height under no load exerted on the tire; and
the tire cross sectional height (SH) as a height in the tire radial direction measured from the rim baseline to the outer diameter of the tire, of the tire side portion on the vehicle outer side, is smaller than the tire cross sectional height (SH) of the tire side portion on the vehicle inner side.

2. The pneumatic radial tire of claim 1, wherein said distance $H_{in}$ in the tire radial direction between the imaginary line $R_{in}$ and a ground-contact end on the vehicle inner side of the tread is set to be 1.1 to 1.3 times as large as said distance $H_{out}$ in the tire radial direction between the imaginary line $R_{out}$ and a ground-contact end on the vehicle outer side of the tread.

3. The pneumatic radial tire of claim 1, wherein:
the ground-contact surface of the tread of the half portion, on the vehicle inner side with respect to the tire equatorial plane, of the tire when the tire is mounted on the vehicle is provided with two circumferential main grooves;
the ground-contact surface of the tread of the half portion, on the vehicle outer side with respect to the tire equatorial plane, of the tire when the tire is mounted on the vehicle is provided with one circumferential main groove; and
the average width of a land portion row demarcated between the one circumferential main groove of the ground-contact surface of the vehicle-outer side half portion of the tire and one of the two circumferential main grooves, which is adjacent to the one circumferential main groove, of the ground-contact surface of the vehicle-inner side half portion of the tire is set to be at least 1.5 times as wide as the average width of a land portion row demarcated between the two circumferential main grooves of the ground-contact surface of the vehicle-inner side half portion of the tire.

4. The pneumatic radial tire of claim 1, wherein dimension in the tire radial direction of a bead filler, provided on the outer peripheral side of each bead core and between a carcass main body extending in a toroidal shape across the bead cores and the turn-up portion of the carcass, is set to be in the range of 10 mm to 20 mm.

5. The pneumatic radial tire of claim 1, wherein:
the tire further includes at least one belt layer formed by belt cords and provided on the outer peripheral side of a crown region of the carcass; and
an external end in the tire radial direction of the turn-up portion of the carcass of at least one of the vehicle-outer side half portion and the vehicle-inner side half portion of the tire is positioned, in the tire radial direction, between the maximum width position remotest from the tire equatorial plane and the outermost end in the tire widthwise direction of the belt layer in the tire side portions (inclusive of the maximum width position and exclusive of the position corresponding to the outermost end in the widthwise direction of the belt layer).

6. The pneumatic radial tire of claim 1, wherein the negative ratio in the vehicle-inner side half portion is 1.5 to 2.0 times as large as the negative ratio in the vehicle-outer side half portion.

* * * * *